US012087232B2

(12) United States Patent
Noh et al.

(10) Patent No.: US 12,087,232 B2
(45) Date of Patent: Sep. 10, 2024

(54) GATE DRIVER AND DISPLAY DEVICE USING THE SAME

(71) Applicant: LG Display Co., Ltd., Seoul (KR)

(72) Inventors: Seok Noh, Paju-si (KR); Ki Min Son, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/471,129

(22) Filed: Sep. 20, 2023

(65) Prior Publication Data

US 2024/0194150 A1 Jun. 13, 2024

(30) Foreign Application Priority Data

Dec. 12, 2022 (KR) ........................ 10-2022-0172605

(51) Int. Cl.

| | |
|---|---|
| ***G09G 3/3266*** | (2016.01) |
| ***G09G 3/32*** | (2016.01) |
| ***G09G 3/3291*** | (2016.01) |

(52) U.S. Cl.

CPC ............. *G09G 3/3266* (2013.01); *G09G 3/32* (2013.01); *G09G 3/3291* (2013.01); *G09G 2310/0267* (2013.01); *G09G 2310/0275* (2013.01); *G09G 2310/0286* (2013.01)

(58) Field of Classification Search

CPC ...... G09G 3/3266; G09G 3/32; G09G 3/3291; G09G 2310/0267; G09G 2310/0275; G09G 2310/0286

See application file for complete search history.

(56) References Cited

U.S. PATENT DOCUMENTS

| | | | | |
|---|---|---|---|---|
| 2015/0077407 A1* | 3/2015 | Kim | ..................... | G09G 3/3611 345/204 |
| 2015/0287376 A1* | 10/2015 | Lim | ..................... | G09G 3/3677 345/92 |
| 2018/0130435 A1* | 5/2018 | Lee | ..................... | G09G 3/3677 |
| 2020/0118509 A1* | 4/2020 | Noh | ..................... | G11C 19/28 |
| 2021/0104197 A1* | 4/2021 | Choi | ..................... | G09G 3/3266 |

FOREIGN PATENT DOCUMENTS

| | | |
|---|---|---|
| KR | 10-2018-0066375 A | 6/2018 |
| KR | 10-2019-0014842 A | 2/2019 |
| KR | 10-2234096 B1 | 3/2021 |

* cited by examiner

*Primary Examiner* — Premal R Patel

(74) *Attorney, Agent, or Firm* — Seed IP Law Group LLP

(57) ABSTRACT

A gate driver according to an embodiment and a display device using the same are disclosed. The gate driver includes a plurality of signal transmitters, wherein an nth signal transmitter includes, a (1-1)th output circuit configured to output a carry signal to a first output node according to a voltage of a first control node and a voltage of a second control node, a (1-2)th output circuit configured to output a boosting signal to a second output node according to a voltage of the first control node and a voltage of the second control node, wherein the (1-2)th output circuit includes a pull-up transistor configured to apply a gate high voltage to the first output node, a pull-down transistor configured to apply a gate low voltage to the first output node, and a first capacitor connected between a gate of the pull-up transistor and the second output node.

20 Claims, 21 Drawing Sheets

GATE DRIVER AND DISPLAY DEVICE USING THE SAME

CROSS-REFERENCE TO RELATED APPLICATION

This application claims priority to and the benefit of Korean Patent Application No. 10-2022-0172605, filed on Dec. 12, 2022, the disclosure of which is incorporated herein by reference in its entirety.

BACKGROUND

Technical Field

The present disclosure relates to a gate driver and a display device using the same.

Description of the Related Art

Display devices includes a liquid crystal display (LCD) device, an electroluminescence display device, a field emission display (FED) device, a plasma display panel (PDP), and the like.

Electroluminescent display devices are divided into inorganic light emitting display devices and organic light emitting display devices according to a material of a light emitting layer. An active-matrix type organic light emitting display device reproduces an input image using a self-emissive element which emits light by itself, for example, an organic light emitting diode (hereinafter referred to as an "OLED"). An organic light emitting display device has advantages in that a response speed is fast and luminous efficiency, luminance, and a viewing angle are large.

BRIEF SUMMARY

The present disclosure provides a gate driver and a display device using the same.

It should be noted that technical features of the present disclosure are not limited to the technical features specifically discussed herein, and other technical features of the present disclosure will be apparent to those skilled in the art from the following descriptions.

According to an aspect of the present disclosure, there is provided a gate driver including a plurality of signal transmitters connected in a cascaded manner via a carry line through which a carry signal is applied from a previous signal transmitter, wherein an nth (where n is a positive integer) signal transmitter includes, a (1-1)th output circuit configured to output a carry signal to a first output node according to a voltage of a first control node that pulls up an output voltage and a voltage of a second control node that pulls down the output voltage, a (1-2)th output circuit configured to output a carry signal for boosting, referred herein as "boosting signal" for descriptive purposes, to a second output node according to the voltage of the first control node and the voltage of the second control node, and a second output circuit configured to output a gate signal to a third output node according to the voltage of the first control node and the voltage of the second control node, wherein the (1-2)th output circuit includes a pull-up transistor configured to apply a gate high voltage to the first output node in response to a charging voltage for the first control node, a pull-down transistor configured to apply a gate low voltage to the first output node in response to a charging voltage for the second control node, and a first capacitor connected between a gate of the pull-up transistor and the second output node.

According to another aspect of the present disclosure, there is provided a gate driver including a plurality of signal transmitters connected in a cascaded manner via a carry line through which a carry signal is applied from a previous signal transmitter, wherein an nth (where n is a positive integer) signal transmitter includes a first output circuit configured to output a carry signal to a first output node according to a voltage of a first control node that pulls up an output voltage and a voltage of a second control node that pulls down the output voltage, and a second output circuit configured to output a gate signal to a second output node according to the voltage of the first control node and the voltage of the second control node, wherein the first output circuit includes a pull-up transistor configured to apply a gate high voltage to the first output node in response to a charging voltage for the first control node, a pull-down transistor configured to apply a gate low voltage to the first output node in response to a charging voltage for the second control node, a first capacitor connected between a gate of the pull-up transistor and the first output node, and a second capacitor connected between the second output node and a low-potential voltage line.

According to the present disclosure, by connecting capacitors to an output node from which a carry signal is output and connecting the capacitors between a gate electrode of a pull-up transistor and the output node and between the output node and a low-potential voltage line, a rising speed of a gate signal will not be slowed down even when the pull-up transistor that outputs the gate signal is deteriorated, so that output characteristics can be improved.

According to the present disclosure, since capacitors are connected between a gate electrode and an output node of a pull-up transistor and between the output node and a low-potential voltage line, an output loss of a carry signal can be reduced.

The effects of the present disclosure are not limited to the above-mentioned effects, and other effects that are not mentioned will be apparently understood by those skilled in the art from the following description and the appended claims.

BRIEF DESCRIPTION OF THE SEVERAL VIEWS OF THE DRAWINGS

The above and other technical improvements, features, and advantages of the present disclosure will become more apparent to those of ordinary skill in the art by describing example embodiments thereof in detail with reference to the accompanying drawings, in which.

DETAILED DESCRIPTION

Figure 1:
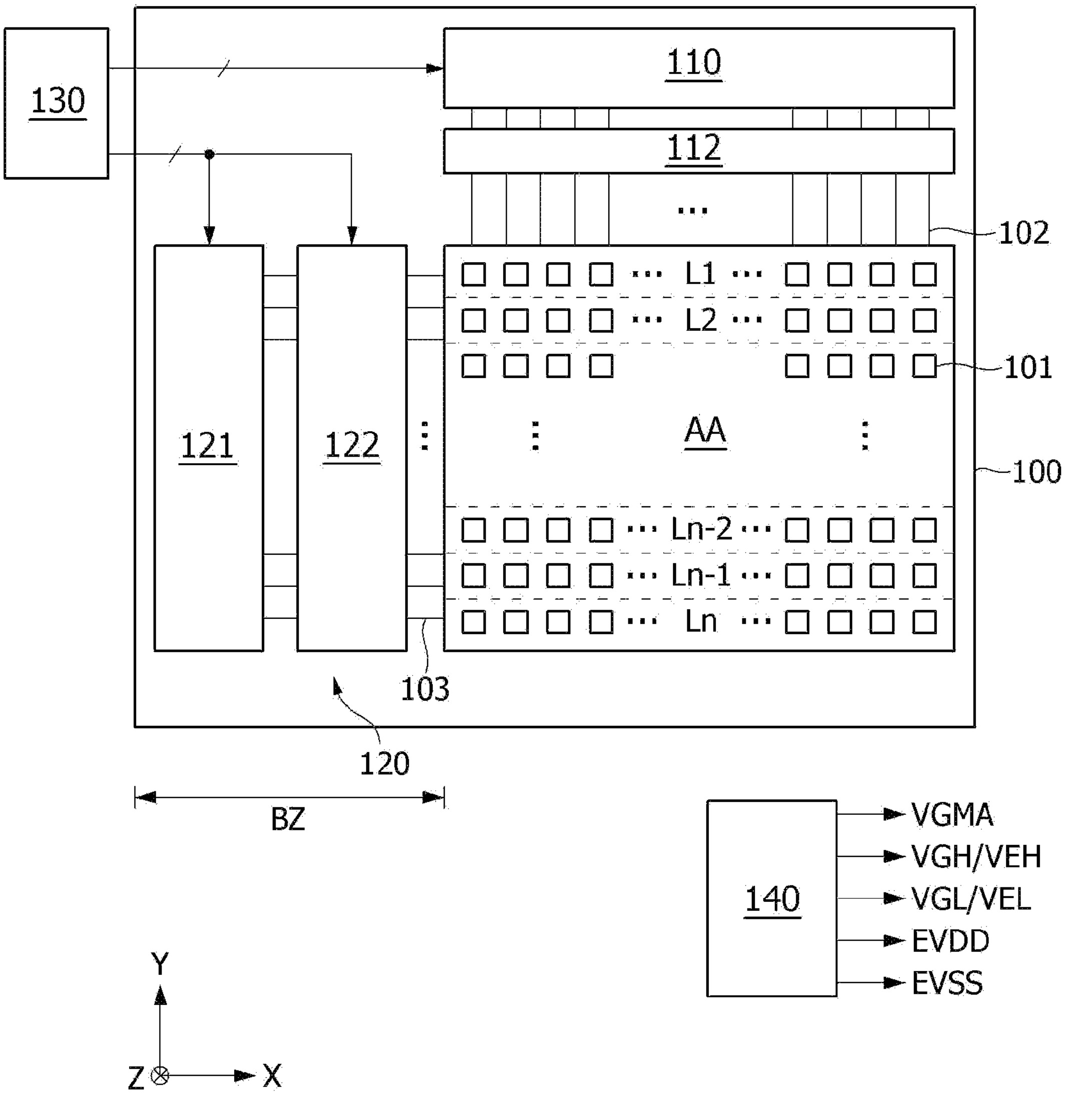
FIG. 1 is a block diagram illustrating a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

The inventors have realized that in some of display devices there are shortcomings with the driving of the pixels. For example, a liquid crystal display device or an organic light emitting display device includes a display panel having a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel. In such a display device, when a driving signal such as a scan signal, an EM signal, and a data signal is supplied to a plurality of sub-pixels formed in the display panel, the selected sub-pixel transmits light or emits light directly to thereby display an image.

At a selected point in time, the gate driver boosts the Q node with the output gate signal. However, as the inventors have realized, as the buffer transistor deteriorates, the rising speed of the output gate signal slows down, resulting in a vicious cycle in which the boosting speed of the Q node slows down and the rising speed of the gate signal slows down again, thereby increasing the degradation of the output performance.

Figure 2:
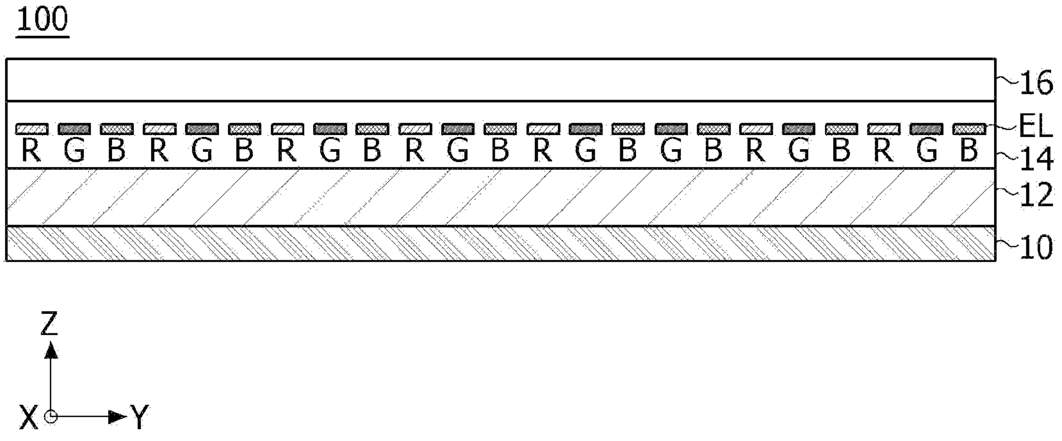
FIG. 2 is a view illustrating a cross-sectional structure of a display panel shown in FIG. 1.

FIG. 1 is a block diagram illustrating a display device according to an embodiment of the present disclosure, and FIG. 2 is a view illustrating a cross-sectional structure of a display panel shown in FIG. 1.

Referring to FIG. 1, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 includes a pixel array AA that displays an input image. The pixel array AA includes a plurality of data lines 102, a plurality of gate lines 103 intersected with the data lines 102, and pixels arranged in a matrix form.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the gate lines 103. Sub-pixels arranged in a column direction Y along a data line direction share the same data line 102. One horizontal period 1H is a time obtained by dividing one frame period by the total number of pixel lines L1 to Ln.

Touch sensors may be disposed on the display panel 100. A touch input may be sensed using separate touch sensors or may be sensed through pixels. The touch sensors may be disposed as an on-cell type or an add-on type on the screen of the display panel or implemented as in-cell type touch sensors embedded in the pixel array AA.

The display panel 100 may be implemented as a flexible display panel. The flexible display panel may be made of a plastic OLED panel. An organic thin film may be disposed on a back plate of the plastic OLED panel, and the pixel array AA may be formed on the organic thin film.

The back plate of the plastic OLED may be a polyethylene terephthalate (PET) substrate. The organic thin film is formed on the back plate. The pixel array AA and a touch sensor array may be formed on the organic thin film. The back plate blocks moisture permeation so that the pixel array AA is not exposed to humidity. The organic thin film may be a thin Polyimide (PI) film substrate. A multi-layered buffer film may be formed of an insulating material (not shown) on the organic thin film. Lines may be formed on the organic thin film so as to supply power or signals applied to the pixel array AA and the touch sensor array.

To implement color, each of the pixels may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel. Each of the sub-pixels 101 includes a pixel circuit. The pixel circuit is connected to the data line 102 and the gate line 103.

Hereinafter, a pixel may be interpreted as having the same meaning as a sub-pixel.

As shown in FIG. 2, when viewed from a cross-sectional structure, the display panel 100 may include a circuit layer 12, a light emitting element layer 14, and an encapsulation layer 16 stacked on a substrate 10.

The circuit layer 12 may include a pixel circuit connected to wirings such as a data line, a gate line, and a power line, a gate driver (GIP) connected to the gate lines, a de-multiplexer array 112, a circuit (not shown) for auto probe inspection, and the like. The wirings and circuit elements of the circuit layer 12 may include a plurality of insulating layers, two or more metal layers separated with the insulating layer therebetween, and an active layer including a semiconductor material. All transistors formed in the circuit layer 12 may be implemented as oxide TFTs having an n-channel type oxide semiconductor.

The light emitting element layer 14 may include a light emitting element EL driven by a pixel circuit. The light emitting element EL may include a red (R) light emitting element, a green (G) light emitting element, and a blue (B) light emitting element. The light emitting element layer 14 may include a white light emitting element and a color filter. The light emitting elements EL of the light emitting element layer 14 may be covered by a protective layer including an organic film and a passivation film.

The encapsulation layer 16 covers the light emitting element layer 14 to seal the circuit layer 12 and the light emitting element layer 14. The encapsulation layer 16 may have a multilayered insulating structure in which an organic film and an inorganic film are alternately stacked. The inorganic film blocks the penetration of moisture and oxygen. The organic film planarizes the surface of the inorganic film. When the organic film and the inorganic film are stacked in multiple layers, a movement path of moisture or oxygen becomes longer compared to a single layer, so that penetration of moisture and oxygen affecting the light emitting element layer 14 can be effectively blocked.

A touch sensor layer may be disposed on the encapsulation layer 16. The touch sensor layer may include capacitive type touch sensors that sense a touch input based on a change in capacitance before and after the touch input. The touch sensor layer may include metal wiring patterns and insulating layers forming the capacitance of the touch sensors. The capacitance of the touch sensor may be formed between the metal wiring patterns. A polarizing plate may be disposed on the touch sensor layer. The polarizing plate may improve visibility and contrast ratio by converting the polarization of external light reflected by metal of the touch sensor layer and the circuit layer 12. The polarizing plate may be implemented as a polarizing plate in which a linear polarizing plate and a phase delay film are bonded, or a circular polarizing plate. A cover glass may be adhered to the polarizing plate.

The display panel 100 may further include a touch sensor layer and a color filter layer stacked on the encapsulation layer 16. The color filter layer may include red, green, and blue color filters and a black matrix pattern. The color filter layer may replace the polarizing plate and increase the color purity by absorbing a part of the wavelength of light reflected from the circuit layer and the touch sensor layer. In this embodiment, by applying the color filter layer 20 having a higher light transmittance than the polarizing plate to the display panel, the light transmittance of the display panel PNL can be improved, and the thickness and flexibility of the display panel PNL can be improved. A cover glass may be adhered on the color filter layer.

The power supply 140 generates DC power required for driving the pixel array AA and the display panel driving circuit of the display panel 100 by using a DC-DC converter. The DC-DC converter may include a charge pump, a regulator, a buck converter, a boost converter, and the like. The power supply 140 may adjust a DC input voltage from a host system (not shown) and thereby generate DC voltages such as a gamma reference voltage VGMA, gate-on voltages VGH and VEH, gate-off voltages VGL and VEL, a pixel driving voltage EVDD, and a pixel low-potential power supply voltage EVSS. The gamma reference voltage VGMA is supplied to a data driver 110. The gate-on voltages VGH and VEH and the gate-off voltages VGL and VEL are supplied to a gate driver 120. The pixel driving voltage EVDD and the pixel low-potential power supply voltage EVSS are commonly supplied to the pixels.

The display panel driving circuit writes pixel data (digital data) of an input image to the pixels of the display panel 100 under the control of a timing controller (TCON) 130.

The display panel driving circuit includes the data driver 110 and the gate driver 120.

A de-multiplexer (DEMUX) array 112 may be disposed between the data driver 110 and the data lines 102. The de-multiplexer array 112 sequentially connects one channel of the data driver 110 to the plurality of data lines 102 and distributes in a time division manner the data voltage outputted from one channel of the data driver 110 to the data lines 102, thereby reducing the number of channels of the data driver 110. The de-multiplexer array 112 may be omitted. In this case, output buffers AMP of the data driver 110 are directly connected to the data lines 102.

The display panel driving circuit may further include a touch sensor driver for driving the touch sensors. The touch sensor driver is omitted from FIG. 1. In a mobile device, the timing controller 130, the power supply 140, the data driver 110, and the like may be integrated into one drive integrated circuit (IC).

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer AMP in each of the channels of the data driver 110.

In the data driver 110, the output buffer AMP included in one channel may be connected to adjacent data lines 102 through the de-multiplexer array 112. The de-multiplexer array 112 may be formed directly on the substrate of the display panel 100 or integrated into one drive IC together with the data driver 110.

The gate driver 120 may be implemented as a gate in panel (GIP) circuit formed directly on a bezel BZ area of the display panel 100 together with the TFT array of the pixel array AA. The gate driver 120 sequentially outputs gate signals to the gate lines 103 under the control of the timing controller 130. The gate driver 120 may sequentially supply the gate signals to the gate lines 103 by shifting the gate signals using a shift register.

The gate signal may include a scan signal for selecting pixels of a line in which data is to be written in synchronization with the data voltage, and an EM signal defining an emission time of pixels charged with the data voltage.

The gate driver 120 may include a scan driver 121, and an EM driver 122.

The scan driver 121 outputs a scan signal SCAN in response to a start pulse and a shift clock from the timing controller 130, and shifts the scan signal SCAN according to the shift clock timing. The EM driver 122 outputs an EM signal EM in response to a start pulse and a shift clock from the timing controller 130, and sequentially shifts the EM signal EM according to the shift clock. The initialization driver 123 outputs an initialization signal INIT in response to a start pulse and a shift clock from the timing controller 130, and shifts the initialization signal INIT according to the shift clock timing. Therefore, the scan signal SCAN, the EM signal EM, and the initialization signal INIT are sequentially supplied to the gate lines 103 of the pixel lines L1 to Ln. In case of a bezel-free model, at least some of transistors constituting the gate driver 120 and clock wirings may be dispersedly disposed in the pixel array AA.

The timing controller 130 receives, from a host system (not shown), digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync may be omitted. The data enable signal DE has a cycle of one horizontal period (1H).

The host system may be any one of a television (TV) system, a set-top box, a navigation system, a personal computer (PC), a home theater system, a vehicle system, and a mobile device system.

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the NTSC (National Television Standards Committee) scheme and 50 Hz in the PAL (Phase-Alternating Line) scheme.

Based on the timing signals Vsync, Hsync, and DE received from the host system, the timing controller 130 generates a data timing control signal for controlling the operation timing of the data driver 110, MUX signals for controlling the operation timing of the de-multiplexer array 112, and a gate timing control signal for controlling the operation timing of the gate driver 120.

The voltage level of the gate timing control signal outputted from the timing controller 130 may be converted into the gate-on voltages VGH and VEH and the gate-off voltages VGL and VEL through a level shifter (not shown) and then supplied to the gate driver 120. That is, the level shifter converts a low level voltage of the gate timing control signal into the gate-off voltages VGL and VEL and converts a high level voltage of the gate timing control signal into the gate-on voltages VGH and VEH. The gate timing control signal includes the start pulse and the shift clock.

Figure 3:
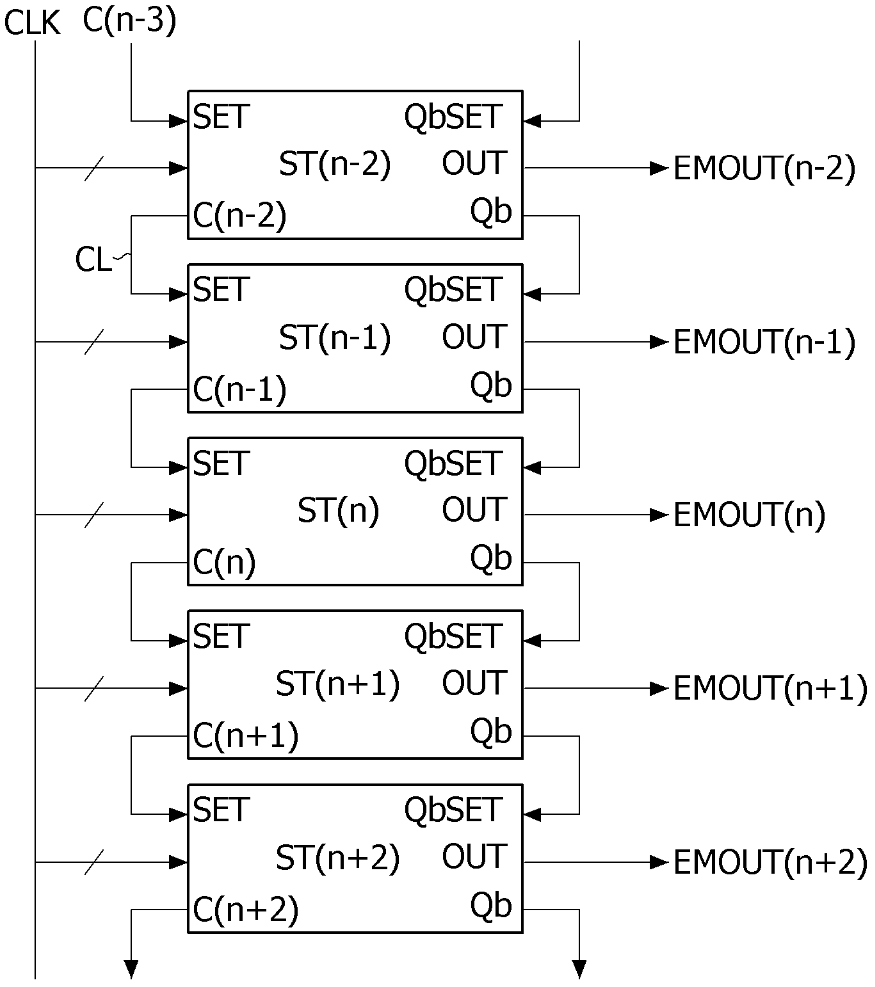
FIG. 3 is a diagram schematically illustrating a gate driver according to the embodiment of the present disclosure.

FIG. 3 is a diagram schematically illustrating a gate driver according to the embodiment of the present disclosure.

Referring to FIG. 3, a gate driver according to the embodiment includes a plurality of signal transmitters . . . , ST(n−2), ST(n−1), ST(n), ST(n+1), ST(n+2), . . . connected in a cascaded manner via a carry line CL through which a carry signal is transmitted.

Each of the signal transmitters ST1 . . . , ST(n−2), ST(n−1), ST(n), ST(n+1), ST(n+2), . . . receives a start pulse Vst or a carry signal C1 . . . , C(n−3), C(n−2), C(n−1), C(n), C(n+1), . . . output from the previous signal transmitter, and receives a shift clock CLK. A first signal transmitter ST1 (not shown) starts to be driven according to a start pulse Vst, and the other signal transmitter . . . , ST(n−2), ST(n−1), ST(n), ST(n+1), ST(n+2), . . . start to be driven by receiving the carry signal . . . , C(n−3), C(n−2), C(n−1), C(n), C(n+1), . . . from the previous signal transmitter as a SET input.

Each of the plurality of signal transmitters . . . , ST(n−2), ST(n−1), ST(n), ST(n+1), ST(n+2), . . . configured as described above may generate an output signal [EMOUT(n)] using the shift clock CLK.

Figure 4:
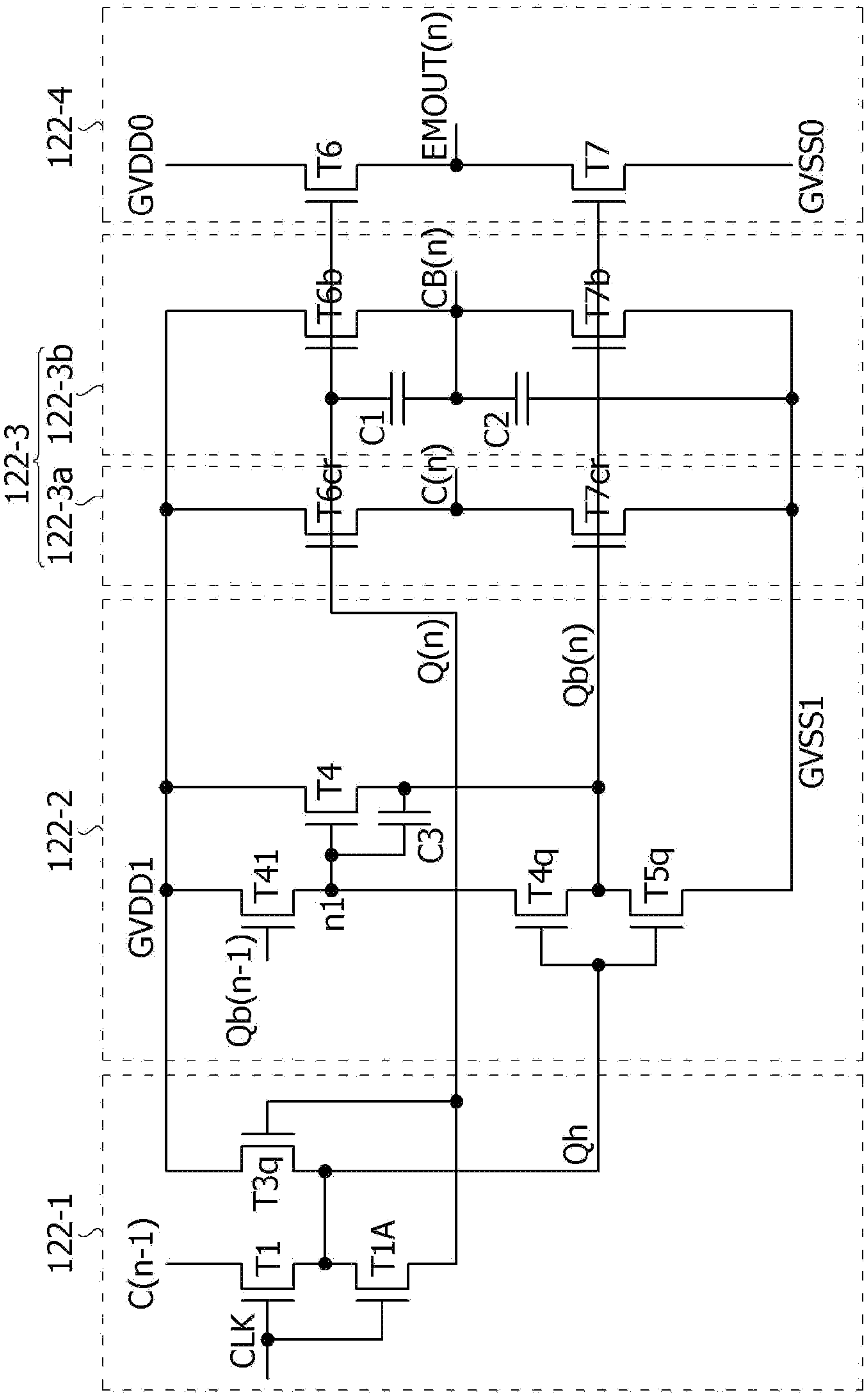
FIG. 4 is a diagram illustrating a gate driver according to a first embodiment of the present disclosure.
Figure 5:
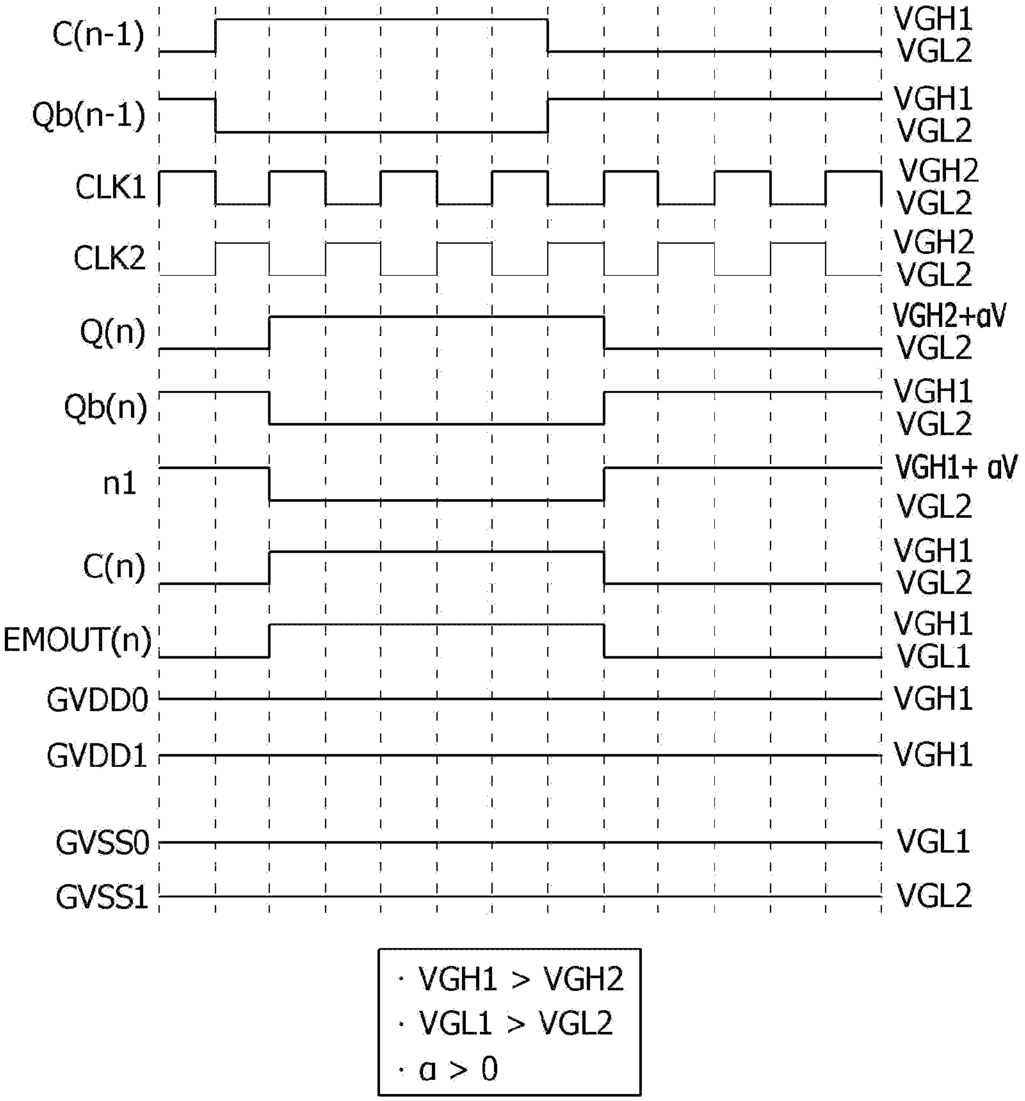
FIG. 5 is a waveform diagram illustrating input/output signals and voltages of control nodes of the gate driver shown in FIG. 4.

FIG. 4 is a diagram illustrating a gate driver according to a first embodiment of the present disclosure, and FIG. 5 is a waveform diagram illustrating input/output signals and voltages of control nodes of the gate driver shown in FIG. 4. Here, an example in which the gate driver is implemented as an emission (EM) driver is described.

Referring to FIGS. 4 and 5, a gate driver 122 according to a first embodiment of the present disclosure may include a first control node (hereinafter, referred to as a “Q node”) for pulling up an output voltage, a second control node (hereinafter, referred to as a “Qb node”) for pulling down the output voltage, a first circuit 122-1, a second circuit 122-2, a first output circuit 122-3, and a second output circuit 122-4.

The first circuit 122-1 serves to control charging (e.g., set to a logic high voltage potential) and discharging (e.g., set to a logic low voltage potential) of a Q node Q(n). The first circuit 122-1 charges the Q node Q(n) by supplying a voltage of an (n−1)th carry signal C(n−1) output from an (n−1)th signal transmitter ST(n−1), which is a previous signal transmitter, to the Q node Q(n) when a shift clock CLK1 is at a high voltage VGH2 greater than or equal to a gate-on voltage VEH. The first circuit 122-1 includes a plurality of transistors T1, T1A, and T3*q*.

A first transistor T1 is turned on when the shift clock CLK1 is at the high voltage VGH2 greater than or equal to the gate-on voltage VEH, and supplies the voltage of the carry signal C(n−1) to a Qh node Qh. The first transistor T1 includes a gate to which the shift clock CLK1 is applied, a first electrode connected to an (n−1)th carry signal line C(n−1), and a second electrode connected to the Qh node Qh.

The high voltage VGH2 of the shift clock CLK1 may be set to a voltage lower than a second high-potential voltage VGH1. A high voltage VGH1 of each of the carry signal C(n−1) and the first gate signal EMOUT(n) is the same voltage as the second high-potential voltage VGH1. When the high voltage VGH2 of the shift clock CLK1 is set to be lower than the second high-potential voltage VGH1, the Q node Q(n) may be floated when a threshold voltage Vth of the first transistor T1 is shifted to a negative polarity (−Vth) at the time of charging of the Q node Q(n), so that voltage boosting of the Q node Q(n) may be performed well.

A 1Ath transistor T1A is turned on when the shift clock CLK1 is at the voltage VGH2 greater than or equal to the gate-on voltage VEH, and supplies the voltage of the Qh node Qh to the Q node Q(n) to charge and discharge the Q node Q(n). The 1Ath transistor T1A includes a gate to which the shift clock CLK1 is applied, a first electrode connected to the Qh node Qh, and a second electrode connected to the Q node Q(n).

Here, a plurality of transistors T1 and T1A are connected in series. The plurality of transistors T1 and T1A are connected in series between the (n−1)th carry signal line C(n−1) and the Qh node Qh.

A 3qth transistor T3*q* is turned on when the Q node Q(n) is charged, and supplies the second high-potential voltage to the Qh node Qh via a second high-potential voltage line GVDD1. The second high-potential voltage is supplied to the Qh node Qh via the second high-potential voltage line GVDD1. The 3qth transistor T3*q* includes a gate connected to the Q node Q(n), a first electrode connected to the second high-potential voltage line GVDD1, and a second electrode connected to the Qh node Qh.

The second circuit 122-2 includes an inverter circuit that inverts the voltage of the Q node Q(n) and applies the inverted voltage to a Qb node Qb(n). The inverter circuit of the second circuit 122-2 includes a Qb node charging circuit and a Qb node discharging circuit.

The Qb node charging circuit includes a plurality of transistors T4 and T41. The Qb node discharging circuit includes a plurality of transistors T4*q* and T5*q*, wherein the plurality of transistors T4*q* and T5*q* are connected in series.

The Qb node charging circuit switches a current path between the second high-potential voltage line GVDD1 and the Qb node Qb(n) according to a voltage of an (n−1)th Qb node Qb(n−1) of the (n−1)th signal transmitter ST(n−1).

A fourth transistor T4 is turned on when a voltage of a first node n1 is a high voltage greater than or equal to the gate-on voltage VEH to connect the second high-potential voltage line GVDD1 to the Qb node Qb(n), thereby charging the Qb node Qb(n) to the high voltage greater than or equal to the gate-on voltage VEH. The fourth transistor T4 includes a gate connected to the first node n1, a first electrode connected to the second high-potential voltage line GVDD1, and a second electrode connected to the Qb node Qb(n). A third capacitor C3 is connected between the gate and the second electrode of the fourth transistor T4. When the fourth transistor T4 is turned on, the voltage of the first node n1 may be boosted by the third capacitor C3.

A 41st transistor T41 is turned on when the voltage of the (n−1)th Qb node Qb(n−1) of the (n−1)th signal transmitter ST(n−1) is a high voltage greater than or equal to the gate-on voltage VEH and supplies the second high-potential voltage to the first node n1 to charge the first node n1 to be greater than or equal to the gate-on voltage VEH. The 41st transistor T41 includes a gate connected to the (n−1)th Qb node Qb(n−1) of the (n−1)th signal transmitter ST(n−1), a first electrode connected to the second high-potential voltage line GVDD1, and a second electrode connected to the first node n1.

The Qb node discharging circuit is turned on when the voltage of the Qh node Qh is a high voltage greater than or equal to the gate-on voltage VEH, thereby discharging the Qb node Qb(n).

A 4qth transistor T4*q* is turned on when the voltage of the Qh node Qh is a high voltage greater than or equal to the gate-on voltage VEH to connect the first node n1 to the Qb node Qb(n). The 4qth transistor T4*q* includes a first electrode connected to the first node n1, a gate electrode connected to the Qh node Qh, and a second electrode connected to the Qb node Qb(n).

A 5qth transistor T5*q* is turned on when the voltage of the Qh node Qh is a high voltage greater than or equal to the gate-on voltage VEH to connect the Qb node Qb(n) to a second low-potential voltage line GVSS1, thereby discharging the voltage of the Qb node Qb(n) to a second low-potential voltage. The 5qth transistor T5*q* includes a first electrode connected to the Qb node Qb(n), a gate electrode connected to the Qh node Qh, and a second electrode connected to the second low-potential voltage line GVSS1.

The first output circuit 122-3 may output the carry signal C(n) in response to the potential of the Q node Q(n) and the potential of the Qb node Qb(n). The first output circuit 122-3 includes a (1-1)th output circuit 122-3*a* configured to output the carry signal C(n) and a (1-2)th output circuit 122-3*b* configured to output a boosting signal. The (1-1)th output circuit 122-3*a* may include a plurality of buffer transistors T6*cr* and T7*cr* and the (1-2)th output circuit 122-3*b* may include a plurality of buffer transistors T6*b* and T7*b*.

At this point, the carry signal and the boosting signal may be the same signal having the same phase.

The plurality of buffer transistors T6*cr* and T7*cr* may be divided into a first pull-up transistor T6*cr* that is turned on based on the potential of the Q node Q(n) and a first pull-down transistor T7*cr* that is turned on based on the potential of the Qb node Qb(n). The first pull-up transistor T6*cr* has a gate electrode connected to the Q node Q(n), a first electrode connected to the second high-potential voltage line GVDD1, and a second electrode connected to a first output node. The first pull-down transistor T7*cr* may have a gate electrode connected to the Qb node Qb(n), a first electrode connected to the first output node, and a second electrode connected to the second low-potential voltage line GVSS1. The plurality of buffer transistors T6*cr* and T7*cr* may output the carry signal C(n) to the first output node based on the second high-potential voltage applied via the second high-potential voltage line GVDD1 and the second low-potential voltage applied via the second low-potential voltage line GVSS1.

The plurality of buffer transistors T6*b* and T7*b* may be divided into a second pull-up transistor T6*b* that is turned on based on the potential of the Q node Q(n) and a second pull-down transistor T7*b* that is turned on based on the potential of the Qb node Qb(n). The second pull-up transistor T6*b* has a gate electrode connected to the Q node Q(n), a first electrode connected to the second high-potential voltage line GVDD1, and a second electrode connected to a second output node. The second pull-down transistor T7*b* may have a gate electrode connected to the Qb node Qb(n), a first electrode connected to the second output node, and a second electrode connected to the second low-potential voltage line GVSS1. The plurality of buffer transistors T6*b* and T7*b* may output a boosting signal CB(n) to the second output node based on the second high-potential voltage applied via the second high-potential voltage line GVDD1 and the second low-potential voltage applied via the second low-potential voltage line GVSS1.

A first capacitor C1 and a second capacitor C2 may be provided for boosting the Q node Q(n). The first capacitor may be connected between the second high-potential voltage line and the second output node, and the second capacitor C2 may be connected between the second output node and the second low-potential voltage line GVSS1.

The first capacitor C1 and the second capacitor C2 may be designed to have different capacitance values. The second capacitor C2 may be designed to have a smaller capacitance value than the first capacitor C1. For further explanation, as the capacitance value of the second capacitor C2 increases, the boosting characteristic of the Q node Q(n) is improved, but the size of the second pull-down transistor increases and a bezel increases, and the second capacitor C2 serves to assist the operation of the first capacitor C1, and thus the second capacitor C2 does not need to have a large capacitance value.

The second output circuit 122-4 may output an EM signal EMOUT(n) in response to the potential of the Q node Q(n) and the potential of the Qb node Qb(n). The second output circuit 122-4 may include a plurality of buffer transistors T6 and T7 that output the EM signal EMOUT(n).

The plurality of buffer transistors T6 and T7 may be divided into a third pull-up transistor T6 that is turned on based on the potential of the Q node Q(n) and a third pull-down transistor T7 that is turned on based on the potential of the Qb node Qb(n). The third pull-up transistor T6 has a gate electrode connected to the Q node Q(n), a first electrode connected to a first high-potential voltage line GVDD0, and a second electrode connected to a third output node. The third pull-down transistor T7 may have a gate electrode connected to the Qb node Qb(n), a first electrode connected to a third output node, and a second electrode connected to a first low-potential voltage line GVSS0. The plurality of buffer transistors T6 and T7 may output the EM signal EMOUT(n) based on the high-potential voltage applied via the first high-potential voltage line GVDD0 and a first low-potential voltage applied via the first low-potential voltage line GVSS0.

In the embodiment, a capacitor may be connected to the output node from which a carry signal having a small load is output, thereby improving the boosting performance of the Q node Q(n).

FIGS. 6A to 6F are diagrams for comparing and describing boosting performance of the embodiment and a comparative example.

Figure 6A:
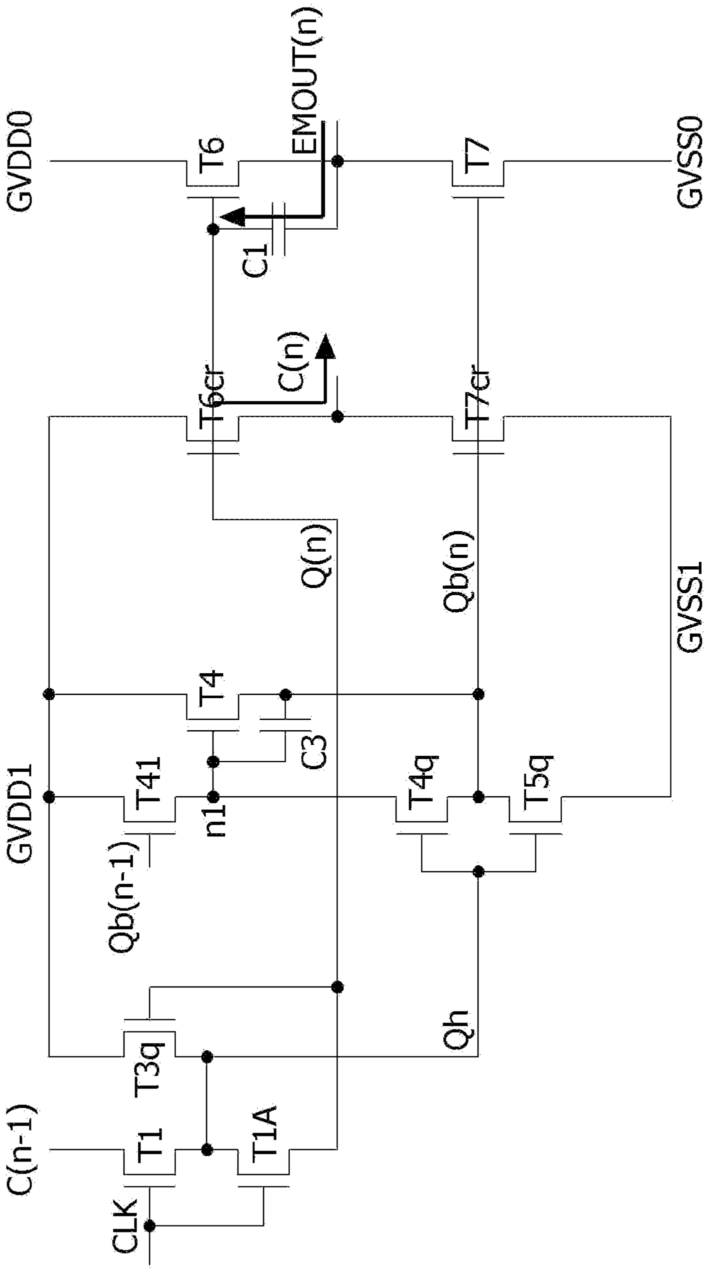
FIGS. 6A to 6F are diagrams for comparing and describing boosting performance of the embodiment and a comparative example.
Figure 6B:
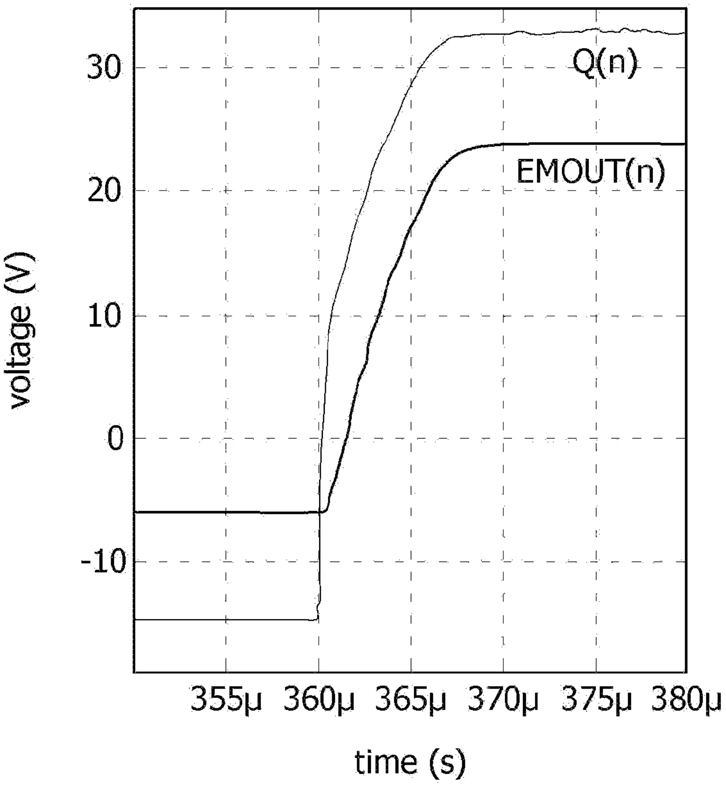
Figure 6C:
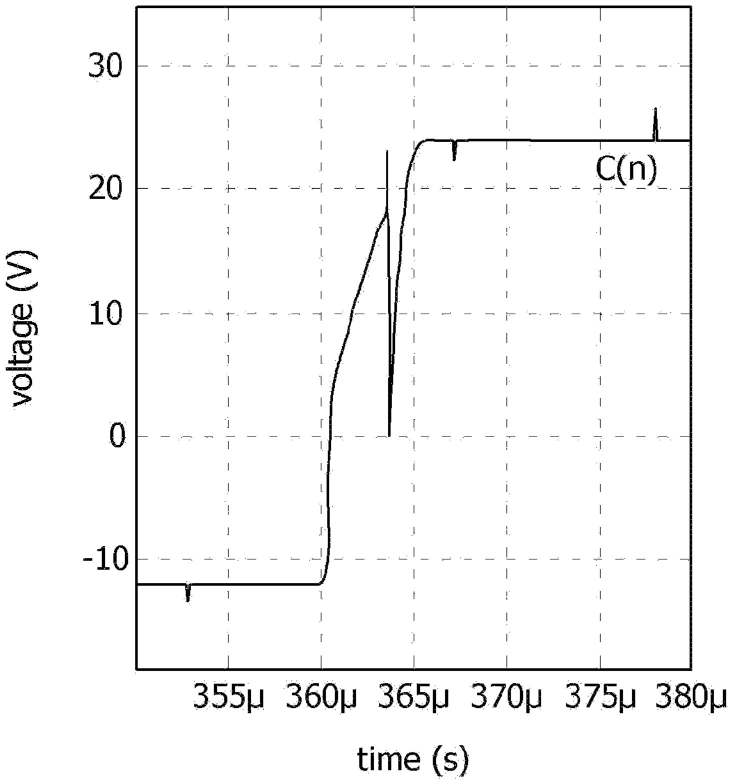

Referring to FIGS. 6A to 6C, a configuration of a gate driver according to a comparative example, a voltage of a Q node Q(n), a voltage of an EM signal EMOUT(n), and a voltage of a carry signal C(n) are shown, respectively.

In the comparative example, a capacitor is connected to an output node, from which the EM signal is output, as shown in FIG. 6A, a rising time of the EM signal EMOUT(n) is increased as shown in FIG. 6B, and a boosting speed of the Q node Q(n) is reduced, resulting in an output loss of the carry signal C(n) as shown in FIG. 6C.

Figure 6D:
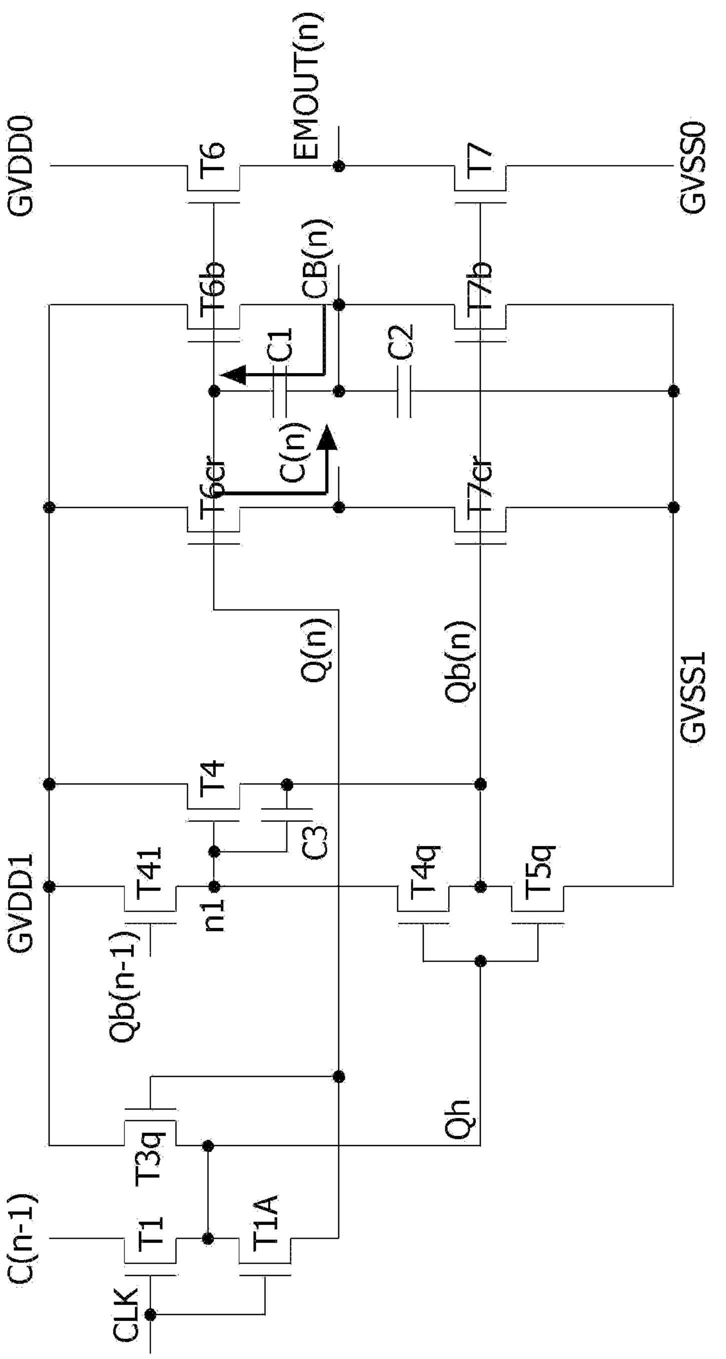
Figure 6E:
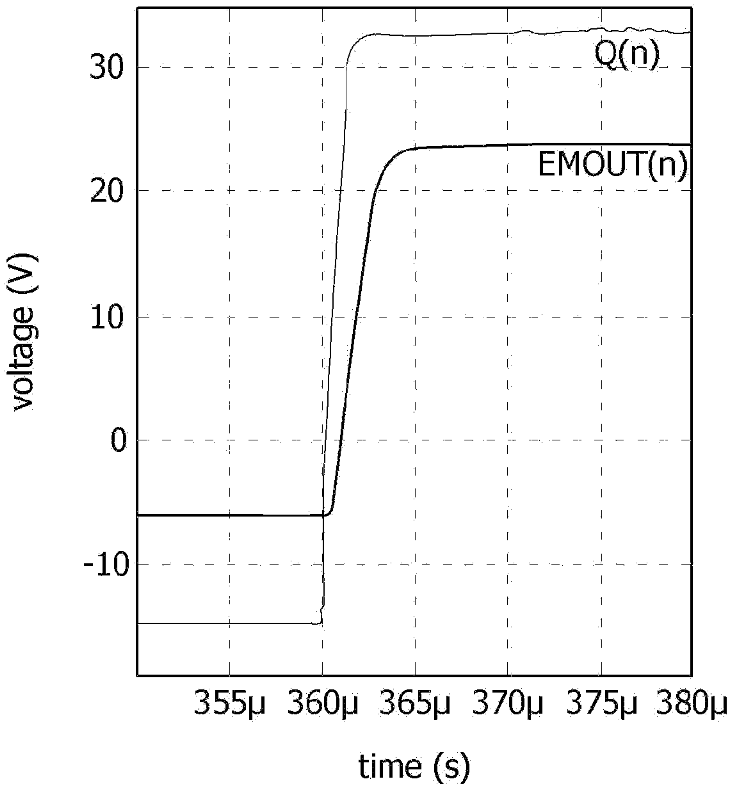
Figure 6F:
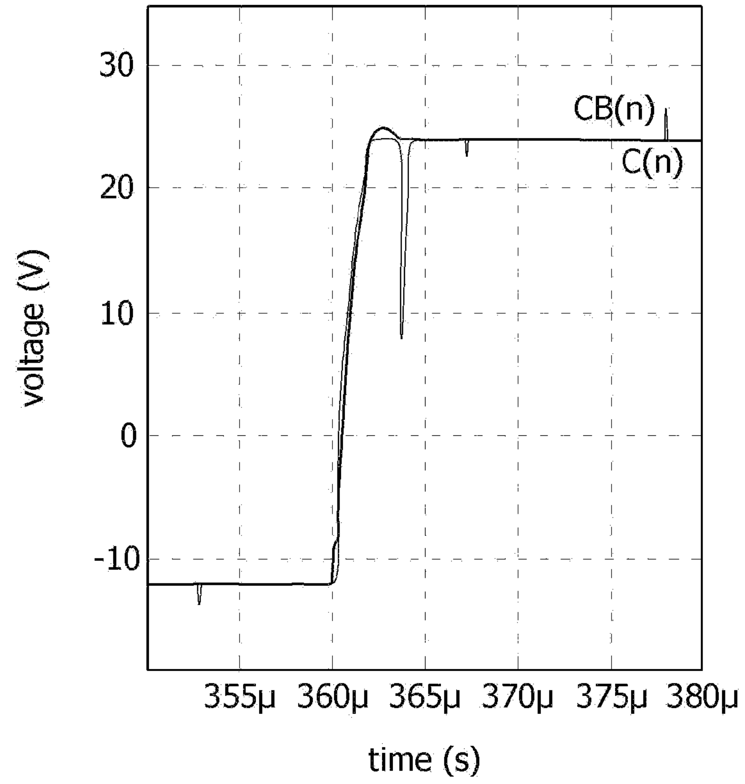

Referring to FIGS. 6D to 6F, a configuration of the gate driver according to the embodiment, a voltage of the Q node Q(n), a voltage of the EM signal EMOUT(n), and a voltage of a carry signal C(n) are shown, respectively.

In the embodiment, the capacitor is connected to the output node, from which the carry signal is output, as shown in FIG. 6D, and a rising time of the EM signal EMOUT(n) is reduced as shown in FIG. 6E, and a boosting speed of the Q node Q(n) is increased to reduce an output loss of the carry signal C(n) as shown in FIG. 6F.

In the embodiment, the buffer transistor for outputting the carry signal and the buffer transistor for boosting are separately configured, so that sinking of the Q node Q(n) may be prevented and output characteristics of the Q node Q(n) may be improved.

FIGS. 7A to 7F are diagrams for comparing and describing output characteristics of the embodiment and a comparative example.

Figure 7A:
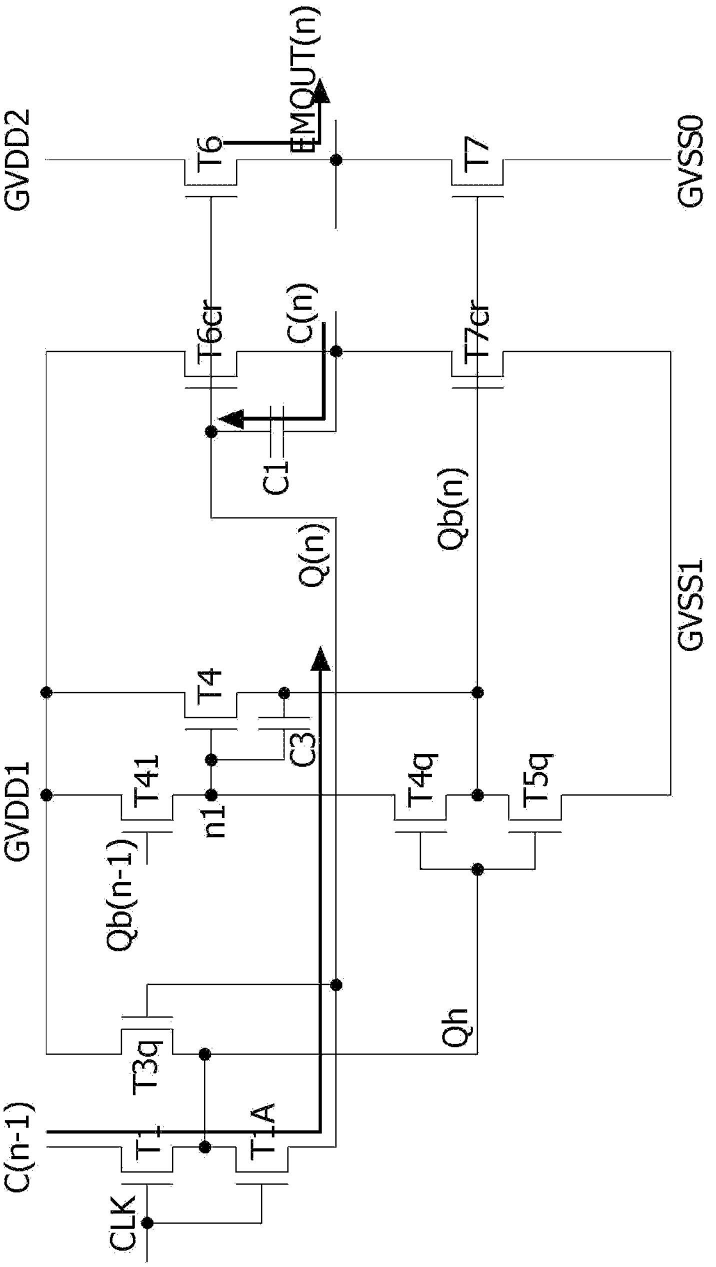
FIGS. 7A to 7F are diagrams for comparing and describing output characteristics of the embodiment and a comparative example.
Figure 7B:
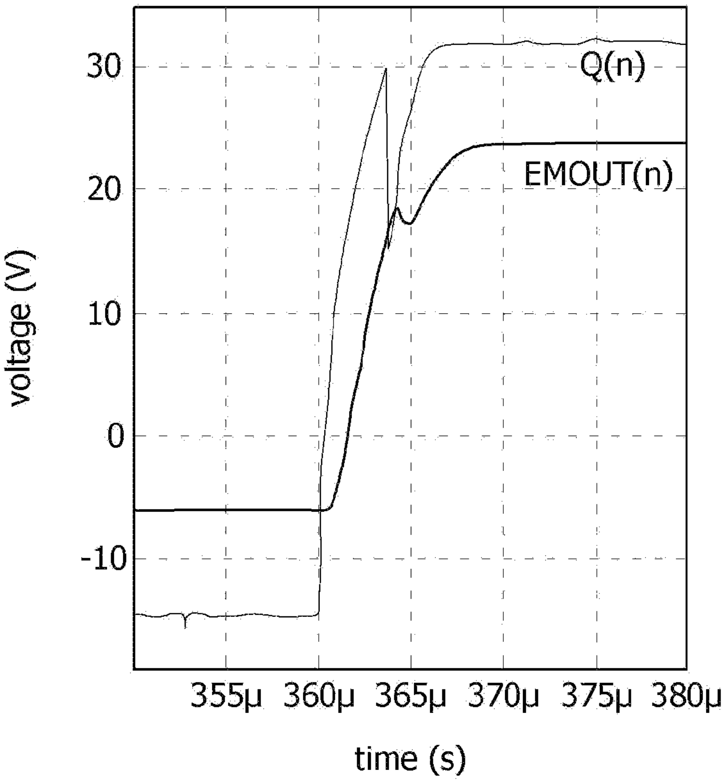
Figure 7C:
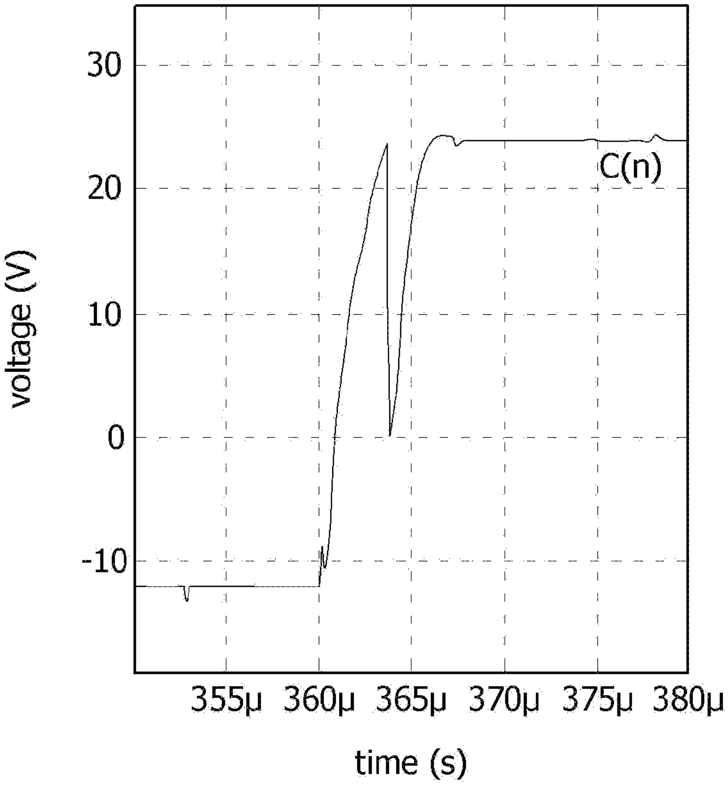

Referring to FIGS. 7A to 7C, a configuration of a gate driver according to a comparative example, a voltage of a Q node Q(n), a voltage of an EM signal EMOUT(n), and a voltage of a carry signal C(n) are shown, respectively.

In the comparative example, a capacitor is connected to an output node, from which a carry signal is output, as shown in FIG. 7A, and sinking occurs in the carry signal, which is output when the Q node Q(n) is charged, as shown in FIG. 7B, and the sinking is transmitted to the Q node Q(n) by the capacitor and the rising speed of the EM signal EMOUT(n) is reduced by the Q node Q(n) as shown in FIG. 7C, causing an output loss.

That is, when the Q node Q(n) is charged, an instantaneous charge transfer causes sinking in the output carry signal, and the sinking affects boosting.

Figure 7D:
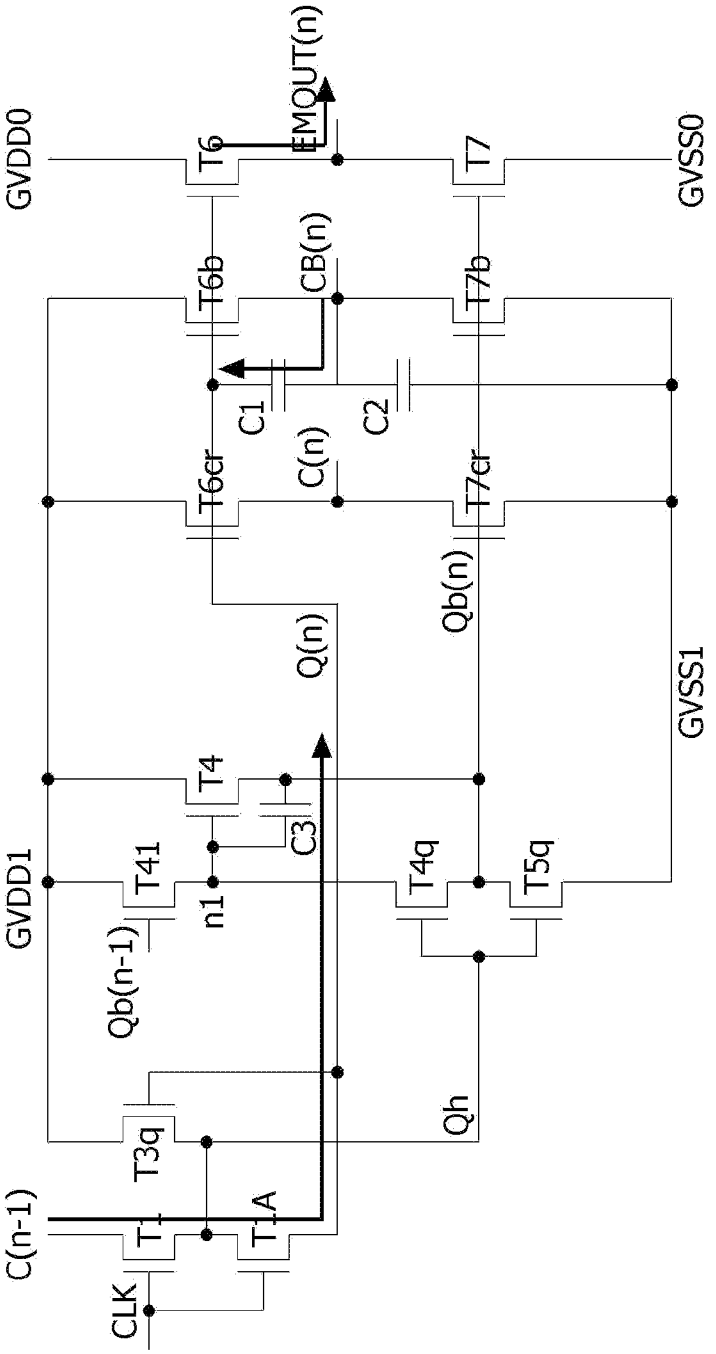
Figure 7E:
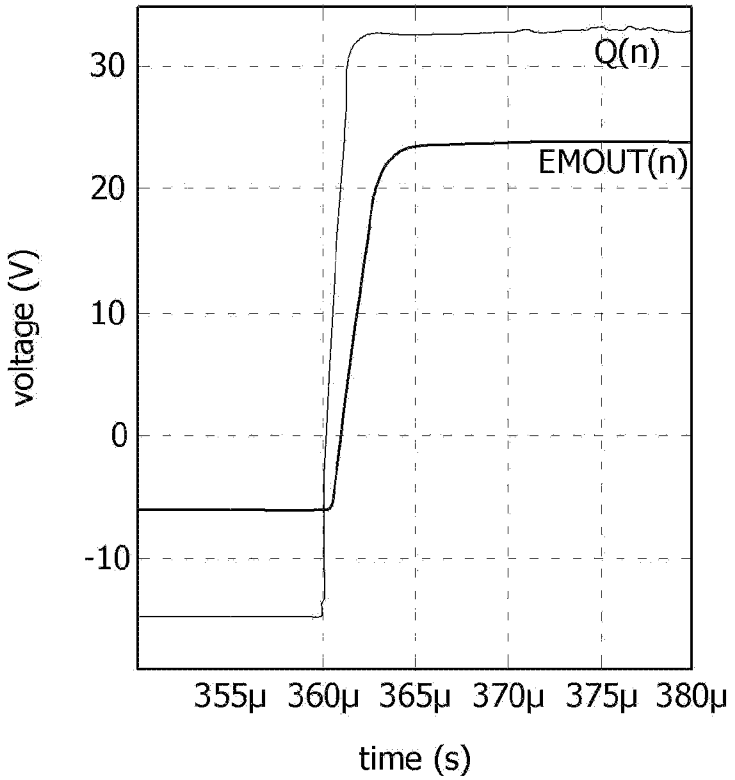
Figure 7F:
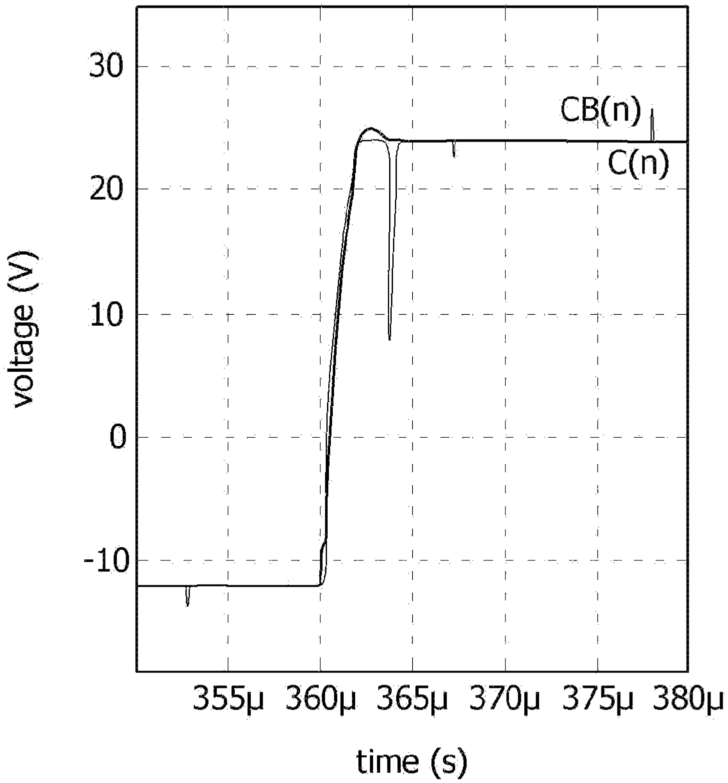

Referring to FIGS. 7D to 7F, the configuration of the gate driver according to the embodiment, a voltage of the Q node Q(n), a voltage of the EM signal EMOUT(n), a voltage of the carry signal C(n), and a voltage of a boosting signal CB(n) are shown, respectively.

In the embodiment, as shown in FIG. 7D, the second output node from which the boosting signal is output is provided separately from the first output node from which the carry signal is output, and the capacitor is connected to the second output node from which the boosting signal is output. Accordingly, as shown in FIG. 7E, since sinking occurs in the output carry signal when the Q node Q(n) is charged, but sinking does not occur in the boosting signal CB(n), and as shown in FIG. 7F, the Q node Q(n) is boosted without being affected by the sinking, so that the rising speed of the EM signal EMOUT(n) is increased and the output loss is reduced.

That is, in the embodiment, since the Q node Q(n) is boosted with the boosting signal CB(n), even when sinking occurs in the carry signal C(n), the sinking is not transmitted to the Q node Q(n).

In an embodiment, the first capacitor C1 is connected to the second output node from which the boosting signal having a small load is output such that the rising speed of the EM signal is rapidly maintained even though the output performance is degraded due to the deterioration of the pull-up transistor. That is, the first capacitor C1 is connected between the gate electrode of the second pull-up transistor T6*b* and the second output node.

In an embodiment, the second capacitor is added together with the first capacitor to the second output node from which the boosting signal is output, so that a minimum gate-to-source voltage Vgs of the second pull-up transistor is secured even when the second pull-down transistor fails to play a role.

FIGS. 8A to 8D are diagrams for comparing and describing output characteristics of the embodiment and a comparative example.

Figure 8A:
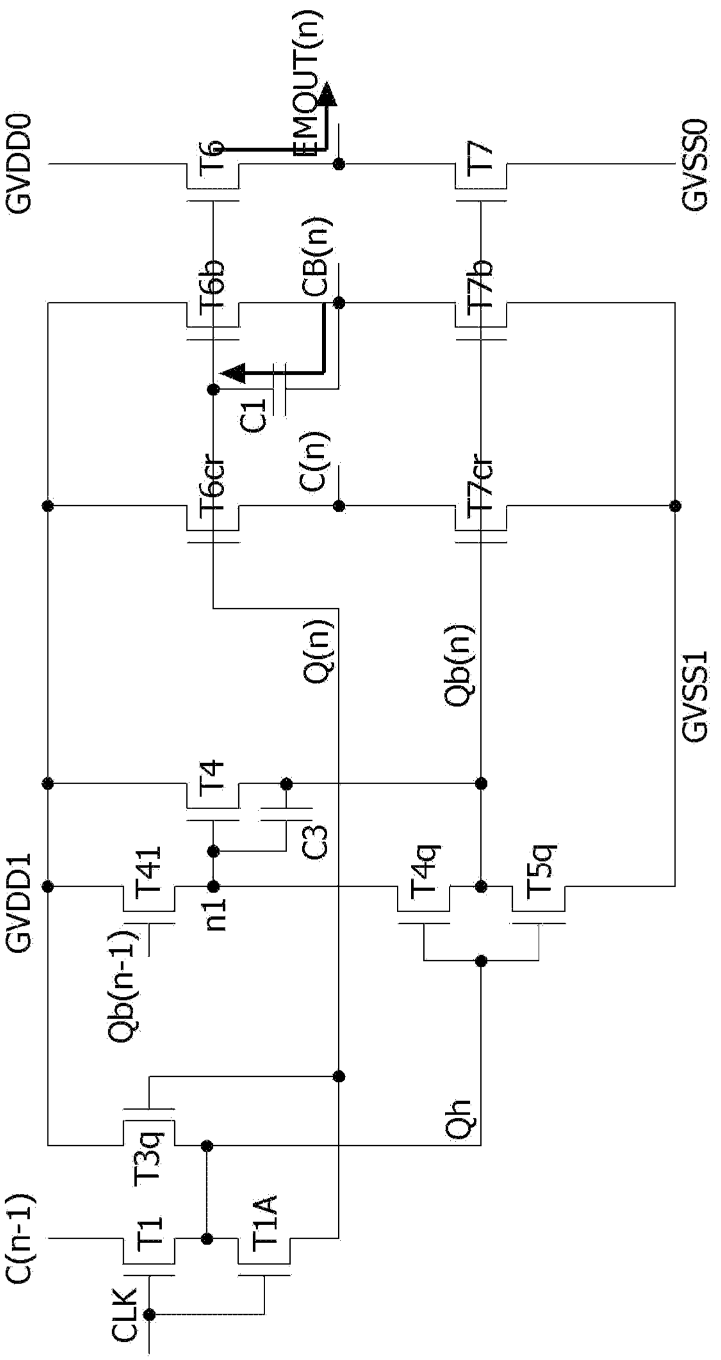
FIGS. 8A to 8D are diagrams for comparing and describing output characteristics of the embodiment and a comparative example.
Figure 8B:
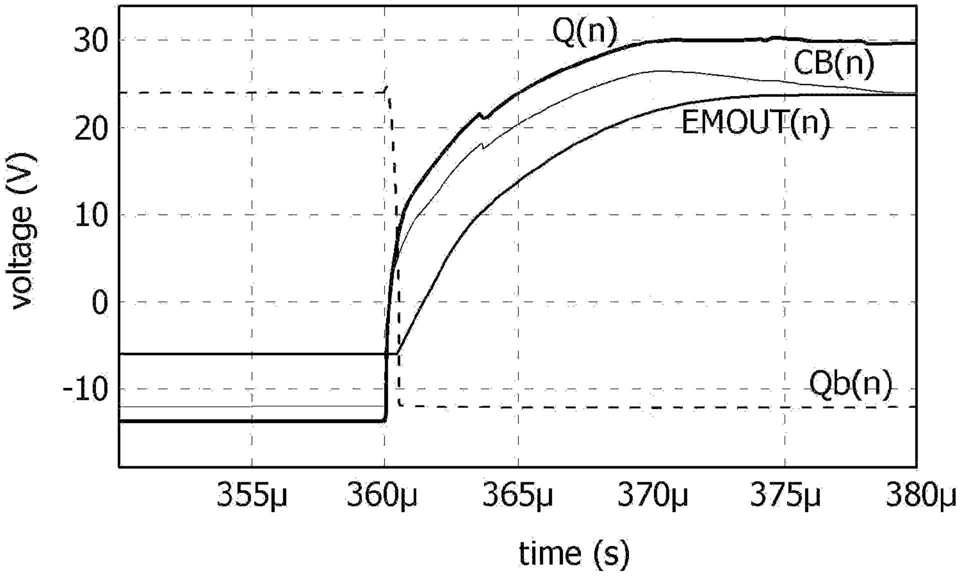

Referring to FIGS. 8A and 8B, a configuration of a gate driver according to a comparative example, a voltage of a Q node Q, a voltage of a Qb node Qb, a voltage of an EM signal EMOUT, and a voltage of a carry signal CBOUT for boosting are shown, respectively.

In the comparative example, as shown in FIG. 8A, a first capacitor C1 is connected to a second output node from which the boosting signal is output, and as shown in FIG. 8B, output characteristics decrease due to the reduction in boosting of the Q node Q(n).

For further explanation, a time point at which the Q node Q(n) is charged is a time point at which the Qb node Qb(n) is converted from a high voltage to a low voltage, and is not a time point at which both the Q node Q(n) and the Qb node Qb(n) operate, and thus a second pull-down transistor is turned off and does not serve to maintain the output voltage at a second low-potential voltage. When the second pull-down transistor is turned off, the second output node is in a floating state, and when the voltage of the Q node Q(n) rises, the voltage of the second output node rises due to the coupling of the first capacitor C1, so that a gate-to-source voltage Vgs of a second pull-up transistor is reduced, which reduces the boosting of the Q node Q(n) and degrades output characteristics.

Figure 8C:
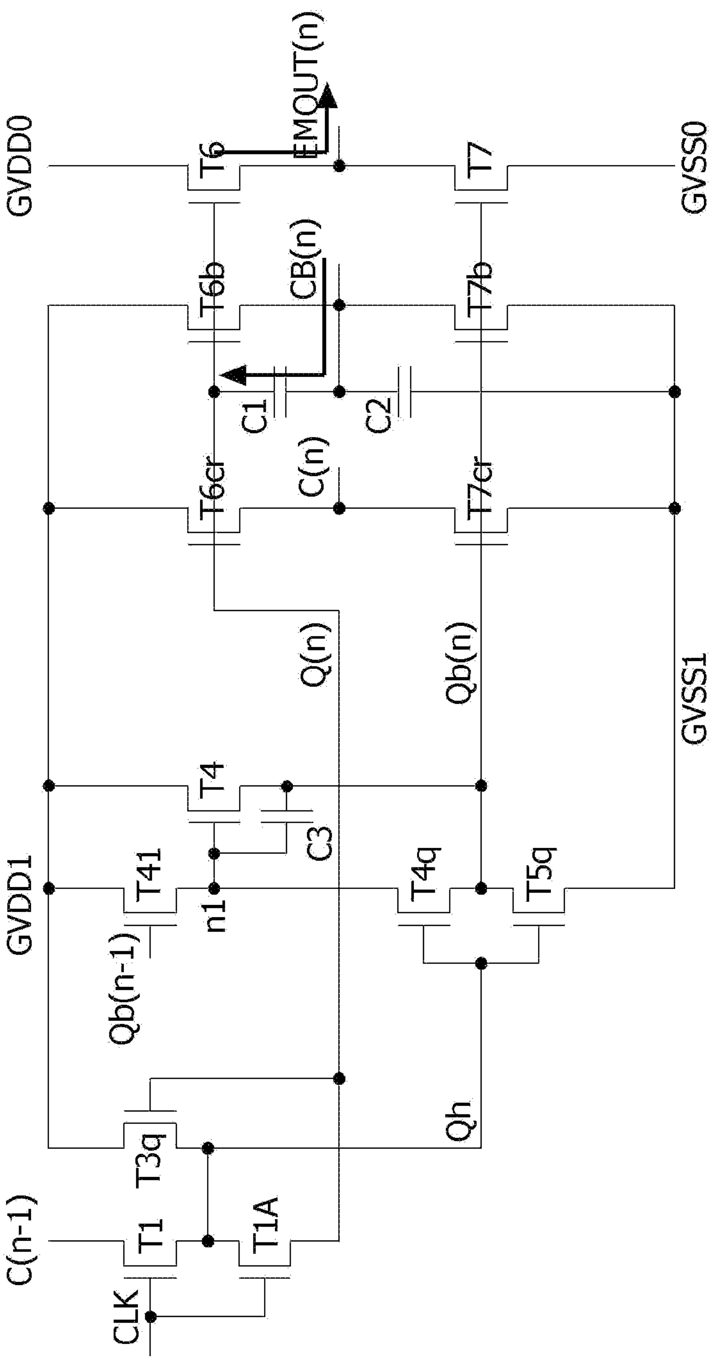
Figure 8D:
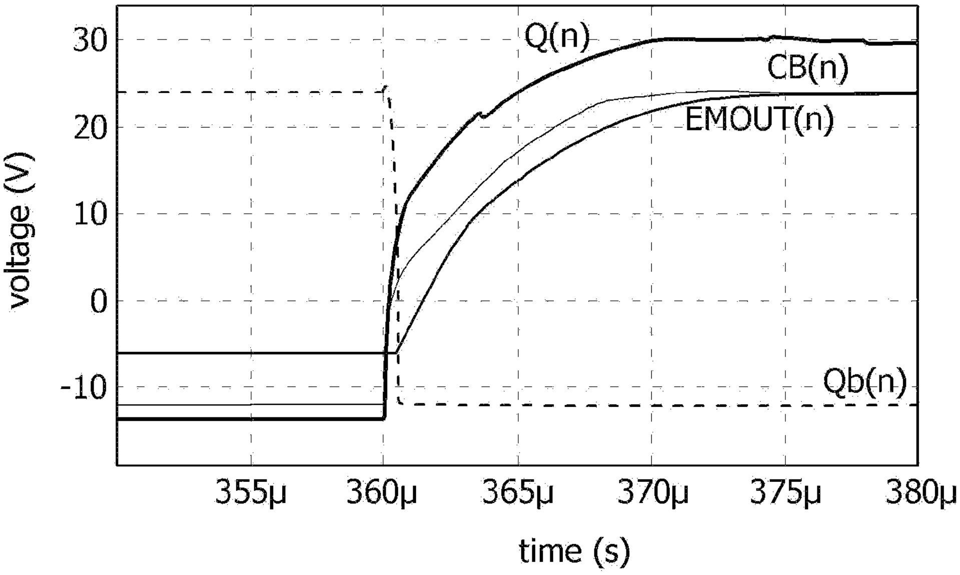

Referring to FIGS. 8C and 8D, the configuration of the gate driver according to the embodiment, a voltage of the Q node Q(n), a voltage of the Qb node Qb(n), a voltage of the EM signal EMOUT(n), and a voltage of the boosting signal CB(n) are shown, respectively.

In the embodiment, as shown in FIG. 8C, the first capacitor C1 and the second capacitor C2 are connected to the second output node from which the boosting signal is output, which improves output characteristics due to the increased boosting of the Q node Q(n) as shown in FIG. 8D.

For further explanation, even when the second pull-down transistor is turned off and the second output node is in a floating state, when the voltage of the Q node Q(n) rises, the second capacitor C2 prevents the voltage of the second output node from rising, so that the gate-to-source voltage Vgs of the second pull-up transistor is maintained and the boosting of the Q node Q(n) increases, thereby improving the output characteristics.

Figure 9:
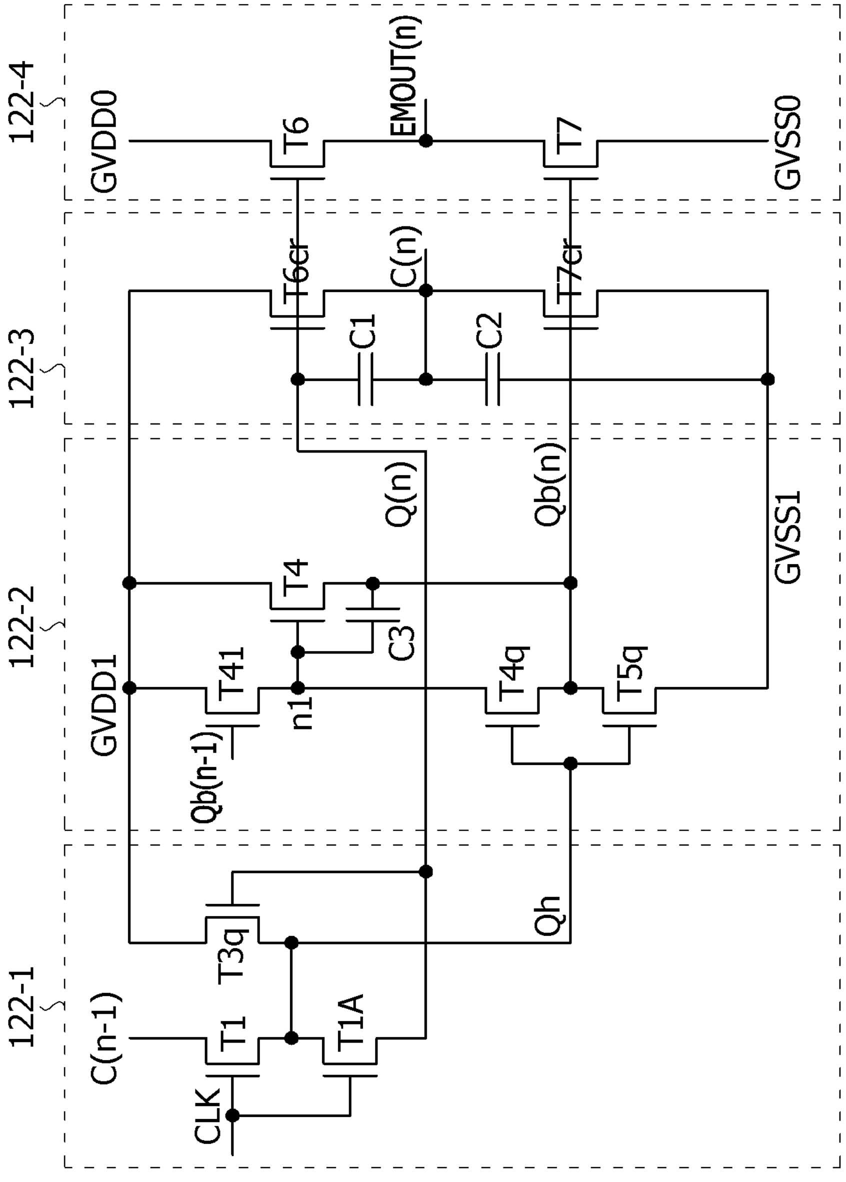
FIG. 9 is a diagram illustrating a gate driver according to a second embodiment of the present disclosure.

FIG. 9 is a diagram illustrating a gate driver according to an embodiment of the present disclosure.

Referring to FIG. 9, a gate driver 122 according to a second embodiment of the present disclosure may include a first control node (hereinafter, referred to as a "Q node") for pulling up an output voltage, a second control node (hereinafter, referred to as a "Qb node") for pulling down the output voltage, a first circuit 122-1, a second circuit 122-2, a first output circuit 122-3, and a second output circuit 122-4.

The first circuit 122-1 serves to control charging (e.g., set to a logic high voltage potential) and discharging (e.g., set to a logic low potential) of a Q node Q(n). The first circuit 122-1 charges the Q node Q(n) by supplying a voltage of an (n−1)th carry signal C(n−1) output from an (n−1)th signal transmitter ST(n−1), which is a previous signal transmitter, to the Q node Q(n) when a shift clock CLK1 is at a high voltage VGH2 greater than or equal to a gate-on voltage VEH. The first circuit 122-1 includes a plurality of transistors T1, T1A, and T3*q*.

A first transistor T1 is turned on when the shift clock CLK1 is at the high voltage VGH2 greater than or equal to the gate-on voltage VEH, and supplies the voltage of the carry signal C(n−1) to a Qh node Qh. The first transistor T1 includes a gate to which the shift clock CLK1 is applied, a first electrode connected to an (n−1)th carry signal line C(n−1), and a second electrode connected to the Qh node Qh.

The high voltage VGH2 of the shift clock CLK1 may be set to a voltage lower than a second high-potential voltage VGH1. A high voltage VGH1 of each of the carry signal C(n−1) and the first gate signal EMOUT(n) is the same voltage as the second high-potential voltage VGH1. When the high voltage VGH2 of the shift clock CLK1 is set to be lower than the second high-potential voltage VGH1, the Q node Q(n) may be floated when a threshold voltage Vth of the first transistor T1 is shifted to a negative polarity (−Vth) at the time of charging of the Q node Q(n), so that voltage boosting of the Q node Q(n) may be performed well.

A 1Ath transistor T1A is turned on when the shift clock CLK1 is at the voltage VGH2 greater than or equal to the gate-on voltage VEH, and supplies the voltage of the Qh node Qh to the Q node Q(n) to charge and discharge the Q node Q(n). The 1Ath transistor T1A includes a gate to which the shift clock CLK1 is applied, a first electrode connected to the Qh node Qh, and a second electrode connected to the Q node Q(n).

Here, a plurality of transistors T1 and T1A are connected in series. The plurality of transistors T1 and T1A are connected in series between the (n−1)th carry signal line C(n−1) and the Qh node Qh.

A 3qth transistor T3*q* is turned on when the Q node Q(n) is charged, and supplies the second high-potential voltage to the Qh node Qh via a second high-potential voltage line GVDD1. The second high-potential voltage is supplied to the Qh node Qh via the second high-potential voltage line GVDD1. The 3qth transistor T3*q* includes a gate connected to the Q node Q(n), a first electrode connected to the second high-potential voltage line GVDD1, and a second electrode connected to the Qh node Qh.

The second circuit 122-2 includes an inverter circuit that inverts the voltage of the Q node Q(n) and applies the inverted voltage to a Qb node Qb(n). The inverter circuit of the second circuit 122-2 includes a Qb node charging circuit and a Qb node discharging circuit.

The Qb node charging circuit includes a plurality of transistors T4 and T41. The Qb node discharging circuit includes a plurality of transistors T4*q* and T5*q*, wherein the plurality of transistors T4*q* and T5*q* are connected in series.

The Qb node charging circuit switches a current path between the second high-potential voltage line GVDD1 and the Qb node Qb(n) according to a voltage of an (n−1)th Qb node Qb(n−1) of the (n−1)th signal transmitter ST(n−1).

A fourth transistor T4 is turned on when a voltage of a first node n1 is a high voltage greater than or equal to the gate-on voltage VEH to connect the second high-potential voltage line GVDD1 to the Qb node Qb(n), thereby charging the Qb node Qb(n) to a high voltage greater than or equal to the gate-on voltage VEH. The fourth transistor T4 includes a gate connected to the first node n1, a first electrode connected to the second high-potential voltage line GVDD1, and a second electrode connected to the Qb node Qb(n). A third capacitor C3 is connected between the gate and the second electrode of the fourth transistor T4. When the fourth transistor T4 is turned on, the voltage of the first node n1 may be boosted by the third capacitor C3.

A 41st transistor T41 is turned on when the voltage of the (n−1)th Qb node Qb(n−1) of the (n−1)th signal transmitter ST(n−1) is a high voltage greater than or equal to the gate-on voltage VEH and supplies the second high-potential voltage to the first node n1 to charge the first node n1 to be greater than or equal to the gate-on voltage VEH. The 41st transistor T41 includes a gate connected to the (n−1)th Qb node Qb(n−1) of the (n−1)th signal transmitter ST(n−1), a first electrode connected to the second high-potential voltage line GVDD1, and a second electrode connected to the first node n1.

The Qb node discharging circuit is turned on when the voltage of the Qh node Qh is a high voltage greater than or equal to the gate-on voltage VEH, thereby discharging the Qb node Qb(n).

A 4qth transistor T4*q* is turned on when the voltage of the Qh node Qh is a high voltage greater than or equal to the gate-on voltage VEH to connect the first node n1 to the Qb node Qb(n). The 4qth transistor T4*q* includes a first electrode connected to the first node n1, a gate electrode connected to the Qh node Qh, and a second electrode connected to the Qb node Qb(n).

A 5qth transistor T5*q* is turned on when the voltage of the Qh node Qh is a high voltage greater than or equal to the gate-on voltage VEH to connect the Qb node Qb(n) to a second low-potential voltage line GVSS1, thereby discharging the voltage of the Qb node Qb(n) to a second low-potential voltage. The 5qth transistor T5*q* includes a first electrode connected to the Qb node Qb(n), a gate electrode connected to the Qh node Qh, and a second electrode connected to the second low-potential voltage line GVSS1.

The first output circuit 122-3 may output the carry signal C(n) in response to the potential of the Q node Q(n) and the potential of the Qb node Qb(n). The first output circuit 122-3 may include a plurality of buffer transistors T6*cr* and T7*cr* that output the carry signal C(n).

The plurality of buffer transistors T6*cr* and T7*cr* may be divided into a first pull-up transistor T6*cr* that is turned on based on the potential of the Q node Q(n) and a first pull-down transistor T7*cr* that is turned on based on the potential of the Qb node Qb(n). The first pull-up transistor T6*cr* has a gate electrode connected to the Q node Q(n), a first electrode connected to the second high-potential voltage line GVDD1, and a second electrode connected to a first output node. The first pull-down transistor T7*cr* may have a gate electrode connected to the Qb node Qb(n), a first electrode connected to the first output node, and a second electrode connected to the second low-potential voltage line GVSS1. The plurality of buffer transistors T6*cr* and T7*cr* may output the carry signal C(n) to the first output node based on the second high-potential voltage applied via the second high-potential voltage line GVDD1 and the second low-potential voltage applied via the second low-potential voltage line GVSS1.

A first capacitor C1 and a second capacitor C2 may be provided for boosting the Q node Q(n). The first capacitor C1 may be connected between the Q node Q(n) and the first output node, and the second capacitor C2 may be connected between the first output node and the second low-potential voltage line GVSS1.

The second output circuit 122-4 may output an EM signal EMOUT(n) in response to the potential of the Q node Q(n) and the potential of the Qb node Qb(n). The second output circuit 122-4 may include a plurality of buffer transistors T6 and T7 that output the EM signal EMOUT(n).

The plurality of buffer transistors T6 and T7 may be divided into a third pull-up transistor T6 that is turned on based on the potential of the Q node Q(n) and a third pull-down transistor T7 that is turned on based on the potential of the Qb node Qb(n). The third pull-up transistor T6 has a gate electrode connected to the Q node Q(n), a first electrode connected to a first high-potential voltage line GVDD0, and a second electrode connected to a third output node. The third pull-down transistor T7 may have a gate electrode connected to the Qb node Qb(n), a first electrode connected to a third output node, and a second electrode connected to a first low-potential voltage line GVSS0. The plurality of buffer transistors T6 and T7 may output the EM signal EMOUT(n) based on the high-potential voltage applied via the first high-potential voltage line GVDD0 and a first low-potential voltage applied via the first low-potential voltage line GVSS0.

A driving timing of the gate driver according to the second embodiment is the same as a driving timing of the gate driver according to the first embodiment and is shown in FIG. 5, and thus a description thereof will be omitted.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gate driver comprising a plurality of signal transmitters connected in a cascaded manner via a carry line through which a carry signal is applied to a signal transmitter from a previous signal transmitter, wherein an nth signal transmitter of the plurality of signal transmitter includes:

a first output circuit configured to output a carry signal to a first output node based on a voltage at a first control node and a voltage at a second control node;

a second output circuit configured to output a boosting signal to a second output node based on the voltage at the first control node and the voltage at the second control node; and a third output circuit configured to output a gate signal to a third output node based on the voltage at the first control node and the voltage at the second control node, wherein the second output circuit includes:

a pull-up transistor configured to apply a gate high voltage to the second output node in response to a charging voltage at the first control node;

a pull-down transistor configured to apply a gate low voltage to the second output node in response to a charging voltage at the second control node; and a first capacitor connected between a gate of the pull-up transistor and the second output node, wherein n is a positive integer.

2. The gate driver of claim 1, wherein the second output circuit further includes a second capacitor connected between the second output node and a low-potential voltage line.

3. The gate driver of claim 2, wherein the first capacitor and the second capacitor have different capacitance values.

4. The gate driver of claim 3, wherein the second capacitor is set to have a smaller capacitance value than the first capacitor.

5. The gate driver of claim 1, wherein the carry signal and the boosting signal have a same phase.

6. The gate driver of claim 1, wherein the first control node is coupled to a first output node of an (n−1)th signal transmitter that is configured to output an (n−1)th carry signal.

7. A gate driver comprising a plurality of signal transmitters connected in a cascaded manner via a carry line through which a carry signal is applied to a signal transmitter from a previous signal transmitter, wherein an nth signal transmitter of the plurality of signal transmitters includes:

a first output circuit configured to output a carry signal to a first output node based on a voltage at a first control node and a voltage at a second control node; and a second output circuit configured to output a gate signal to a second output node based on the voltage at the first control node and the voltage at the second control node, wherein the first output circuit includes:

a pull-up transistor configured to apply a gate high voltage to the first output node in response to a charging voltage at the first control node;

a pull-down transistor configured to apply a gate low voltage to the first output node in response to a charging voltage at the second control node;

a first capacitor connected between a gate of the pull-up transistor and the first output node; and a second capacitor connected between the first output node and a low-potential voltage line, where n is a positive integer.

8. The gate driver of claim 7, wherein the first capacitor and the second capacitor have different capacitance values.

9. The gate driver of claim 8, wherein the second capacitor is set to have a smaller capacitance value than the first capacitor.

10. The gate driver of claim 7, wherein the second control node is coupled to a second control node of an (n−1)th signal transmitter via one or more transistors.

11. A display device comprising:

a display panel in which a plurality of data lines, a plurality of gate lines crossing the data lines, a plurality of power lines to which different constant voltages are applied, and a plurality of sub-pixels are disposed;

a data driver configured to supply a data voltage of pixel data to the data lines; and a gate driver configured to supply a gate signal to the gate lines, wherein the gate driver includes a plurality of signal transmitters connected in a cascaded manner via a carry line through which a carry signal is applied to a signal transmitter from a previous signal transmitter, wherein an nth signal transmitter of the plurality of signal transmitters includes:

a first output circuit configured to output a carry signal to a first output node based on a voltage at a first control node and a voltage at a second control node;

a second output circuit configured to output a boosting signal to a second output node based on the voltage at the first control node and the voltage of the second control node; and a third output circuit configured to output a gate signal to a third output node based on the voltage at the first control node and the voltage at the second control node, wherein the second output circuit includes:

a pull-up transistor configured to apply a gate high voltage to the second output node in response to a charging voltage at the first control node;

a pull-down transistor configured to apply a gate low voltage to the second output node in response to a charging voltage at the second control node; and a first capacitor connected between a gate of the pull-up transistor and the second output node.

12. The display device of claim 11, wherein the second output circuit further includes a second capacitor connected between the second output node and a low-potential voltage line.

13. The display device of claim 12, wherein the first capacitor and the second capacitor have different capacitance values.

14. The display device of claim 13, wherein the second capacitor is set to have a smaller capacitance value than the first capacitor.

15. The display device of claim 11, wherein the carry signal and the boosting signal have a same phase.

16. The display device of claim 11, wherein the second control node is coupled to a second control node of an (n−1)th signal transmitter via one or more transistors.

17. A display device comprising:

a display panel in which a plurality of data lines, a plurality of gate lines crossing the data lines, a plurality of power lines to which different constant voltages are applied, and a plurality of sub-pixels are disposed;

a data driver configured to supply a data voltage of pixel data to the data lines; and a gate driver configured to supply a gate signal to the gate lines, wherein the gate driver includes a plurality of signal transmitters connected in a cascaded manner via a carry line through which a carry signal is applied to a signal transmitter from a previous signal transmitter, wherein an nth signal transmitter of the plurality of signal transmitters includes:

a first output circuit configured to output a carry signal to a first output node based on a voltage at a first control node that pulls up an output voltage at the first output node and a voltage at a second control node that pulls down the output voltage; and a second output circuit configured to output a gate signal to a second output node based on the voltage at the first control node and the voltage at the second control node, wherein the first output circuit includes:

a pull-up transistor configured to apply a gate high voltage to the first output node in response to a charging voltage at the first control node;

a pull-down transistor configured to apply a gate low voltage to the first output node in response to a charging voltage at the second control node;

a first capacitor connected between a gate of the pull-up transistor and the first output node; and a second capacitor connected between the first output node and a low-potential voltage line.

18. The display device of claim 17, wherein the first capacitor and the second capacitor have different capacitance values.

19. The display device of claim 18, wherein the second capacitor is set to have a smaller capacitance value than the first capacitor.

20. The display device of claim 17, wherein the first control node is coupled to a first output node of an (n−1)th signal transmitter that is configured to output an (n−1)th carry signal.

* * * * *